Patented June 13, 1944

2,351,385

UNITED STATES PATENT OFFICE 2,351,385

PROCESS OF PREPARING ANHYDROUS SODIUM-ORTHOSILICATE

Eduard Zintl, Darmstadt, Germany; vested in the Alien Property Custodian

No Drawing. Application December 19, 1940, Serial No. 370,863. In Germany November 11, 1939

4 Claims. (Cl. 23—110)

The present invention relates to a process of preparing anhydrous sodium-orthosilicate.

For preparing in the anhydrous state sodium-orthosilicate ($Na_4SiO_4$) and sodium-pyrosilicate ($Na_6Si_2O_7$), known in the art as "sub-silicates," it has been proposed to heat a mixture of quartz and solid caustic soda in a corresponding proportion up to a temperature below the melting point of caustic soda (322° C.) and, thereupon, to raise the temperature of the sub-silicate obtained to 300° C.–600° C., preferably to 450° C., in order to remove any quantity of water chemically bound or adhering thereto. According to another known process anhydrous solid subsilicate is obtained by introducing, while stirring, quartz into molten sodium hydroxide at a temperature between 300° C. and 600° C., preferably at 500° C.

Thorough experiments have shown that there are only a few exceptional cases in which under the above conditions of working the product theoretically calculated according to the quantities of reactants used, is actually obtained. It has been ascertained that in the preparation of the subsilicates not only the proportion of the substances used and the temperatures of reaction applied have to be considered but also the pressure of the water vapor above the reaction mixture in the reaction vessel which pressure plays a decisive part in the reaction.

According to the present invention the desired composition may only be obtained if the following three factors are considered:

(1) Proportion of the quantities of the starting substances used
(2) Reaction temperature
(3) Pressure of water vapor in the reaction vessel.

I have found that the formation of anhydrous sodium-pyrosilicate from $SiO_2$, advantageously used in the form of quartz, and caustic soda takes place only at a temperature above 402° C. and only if the pressure of water vapor above the reaction mixture during the reaction lies below the value calculated according to Equation I wherein $p_1$ is the pressure of water vapor in mm. Hg and T is the absolute temperature:

$$\log p_1(\text{mm.}) = -\frac{18020}{4.571 \cdot T} + 8.224 \quad (I)$$

Furthermore, I have found that sodium-orthosilicate may be obtained from the above parent materials at temperatures up to 402° C. only if the pressure of water vapor above the reaction mixture is smaller than the pressure $p_2$ calculated according to Equation II:

$$\log p_2(\text{mm.}) = -\frac{11980}{4.571 \cdot T} + 6.268 \quad (II)$$

or at temperatures above 402° C. if the steam pressure above the reaction mixture is smaller than the pressure $p_3$ calculated according to Equation III:

$$\log p_3(\text{mm.}) = -\frac{5797}{4.571 \cdot T} + 4.254 \quad (III)$$

It results from the foregoing that at temperatures below the melting point of caustic soda (322° C.) no sodium-pyrosilicate is formed since it is stable only at temperatures above 402° C. Sodium-orthosilicate may be obtained at temperatures below the melting point of caustic soda only if the pressure of water vapor is smaller than about 73 mm. Hg. If, on the other hand, in a manner analogous to that of the known processes quartz is introduced into molten caustic soda and a vessel provided with a cover is used in which the water vapor produced during the reaction of quartz with caustic soda with formation of metasilicate, remains for some time, neither pyro- nor orthosilicate may be obtained at temperature up to about 460° C. In the presence of water-vapor of atmospheric pressure and in accordance with the above equations orthosilicate is formed only at temperatures above 483° C., pyrosilicate only at temperatures above 465° C. None of these two compounds is obtained at temperatures up to about 400° C. if an oven is used for the reaction which is heated internally by means of gas and in which, therefore, an atmosphere of a high partial pressure of water vapor is always present. Since only hydrogen may be used for heating, the partial pressure of water vapor in the combustion gases amounts, on complete combustion with the aid of air, to about ⅓ atmosphere, that is to say about 250 mm. Hg. At such a pressure of water vapor, however, metasilicate reacts with caustic soda only at temperatures of about 410° C. and above with formation of pyro- or ortho-silicate.

The substitution of sodium metasilicate ($Na_2SiO_3$) or sodium disilicate ($Na_2Si_2O_5$) for the silicic acid ($SiO_2$) in the reaction mixture involves no disadvantages.

Thus, the subject matter of the present invention is a process for preparing anhydrous sodium-orthosilicate and anhydrous sodium-pyrosilicate by heating the respective mixture consisting of silicic acid or sodium metasilicate or sodium disilicate, on the one hand, and caustic soda, on the other hand, to temperatures of between 300° C. and 600° C.; for the preparation of pyrosilicate the temperature is raised to at least 402° C., the pressure of the water vapor above the reaction mixture lying below that calculated according to the foregoing Equation I; for the preparation of orthosilicate at reaction temperatures of up to 402° C. a pressure of water vapor is maintained in the reaction vessel which is below that calculated according to the foregoing Equation II or, if temperatures above 402° C. are used a pressure of water vapor is maintained which is below that calculated according to the foregoing Equation III.

The following examples illustrate the invention; the parts are by weight:

(1) 3 parts by weight of anhydrous sodium metasilicate are intimately mixed with 1 part by weight of anhydrous caustic soda and heated to 450° C., care being taken by introducing air that the pressure of water vapor above the reaction mixture lies below 500 mm. Hg. Crystalline anhydrous sodium pyrosilicate ($Na_6Si_2O_7$) is obtained.

(2) 3 parts by weight of anhydrous sodium metasilicate are intimately mixed with 2 parts by weight of anhydrous caustic soda and heated in a current of dry air to 350° C. The mixture completely reacts with formation of anhydrous crystalline sodium orthosilicate ($Na_4SiO_4$).

(3) 3 parts by weight of finely ground quartz are gradually heated with 8 parts by weight of sodium hydroxide in anhydrous form or in the form of an aqueous solution to 350° C. By passing dry air over the mixture care is taken that the pressure of water vapor above the reaction mixture remains smaller than about 100 mm. Hg. Anhydrous sodium orthosilicate is obtained in a quantitative yield.

What I claim is:

1. A process of preparing anhydrous sodium orthosilicate in a single heating step which comprises, heating a mixture of caustic soda and a compound of the group consisting of silicic acid, sodium metasilicate and sodium disilicate in proportions to form the orthosilicate to a temperature between 300° C. and 402° C. while maintaining the partial pressure of water vapor above said reaction mixture below that calculated according to the equation:

$$\log p_2 (\text{mm.}) = -\frac{11980}{4.571.T} + 6.268$$

wherein T is the absolute temperature on the centigrade scale.

2. The process as defined in claim 1, in which the siliceous reactant is silicic acid.

3. The process as defined in claim 1, in which the siliceous reactant is quartz.

4. The process as defined in claim 1, in which the siliceous reactant is sodium metasilicate.

EDUARD ZINTL.